United States Patent [19]
Romano

[11] Patent Number: 5,146,842
[45] Date of Patent: Sep. 15, 1992

[54] ROTISSERIE

[75] Inventor: Philip J. Romano, Dallas, Tex.

[73] Assignee: Brinker International, Inc., Dallas, Tex.

[21] Appl. No.: 825,964

[22] Filed: Jan. 27, 1992

[51] Int. Cl.$^5$ .......................... A23C 3/00; A47J 37/04
[52] U.S. Cl. ................................. 99/421 V; 99/419; 99/421 R; 126/25 R
[58] Field of Search .............. 99/421 V, 421 R, 419, 99/448, 449, 450, 420, 421 H, 421 HH, 421 HV, 421 M, 421 P, 482, 421 TP; 126/25 R, 9 R, 9 B; 211/125, 162

[56] References Cited

U.S. PATENT DOCUMENTS

| | | | |
|---|---|---|---|
| 1,782,639 | 11/1930 | Van Allen | 99/421 P |
| 2,486,345 | 10/1949 | Triulzi | 99/421 HV |
| 2,589,626 | 3/1952 | Paul | 99/421 HH |
| 2,887,944 | 5/1959 | Walker | 99/421 HH |
| 3,169,470 | 2/1965 | Oatley | 99/421 HH |
| 3,309,982 | 3/1967 | Surks | 99/420 |
| 3,387,555 | 6/1968 | Moran | 99/421 HV |
| 3,848,523 | 11/1974 | Galisz et al. | 126/25 R |
| 4,154,154 | 5/1979 | Vivian | 99/419 |
| 4,286,133 | 8/1981 | Einset et al. | 99/421 P |
| 5,001,971 | 3/1991 | Beller | 99/421 A |

FOREIGN PATENT DOCUMENTS

| | | | |
|---|---|---|---|
| 2143196 | 3/1973 | Fed. Rep. of Germany | 99/421 H |
| 2561897 | 10/1985 | France | 99/419 |
| 729853 | 9/1972 | Italy | 99/419 |
| 0662497 | 10/1987 | Switzerland | 99/421 R |

*Primary Examiner*—Timothy F. Simone
*Attorney, Agent, or Firm*—Richards, Medlock & Andrews

[57] ABSTRACT

A rotisserie for use in cooking meat on a spit. The spit is releasably coupled to a spit retainer which is rotatably mounted on a central post. A drive mechanism is mounted on the spit retainer and imparts rotational motion thereto. The central post is pivotally mounted whereby the spit can be rotated between a first position in which the meat can be removed from the spit and a second position in which the spit is in a cooking position.

14 Claims, 3 Drawing Sheets

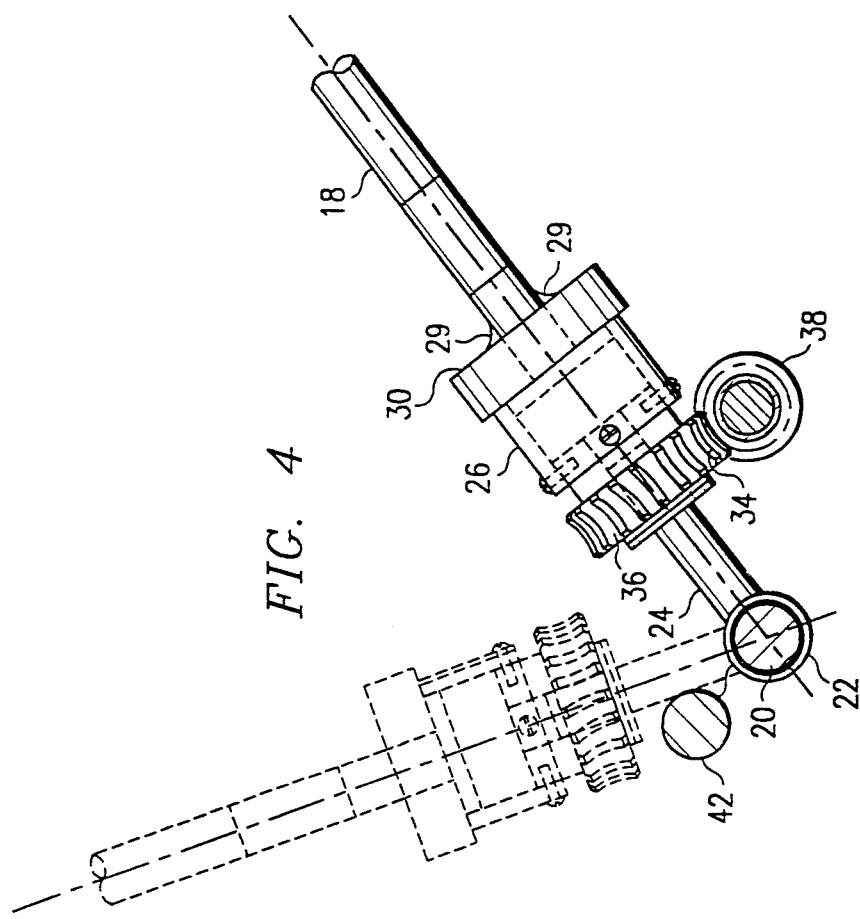
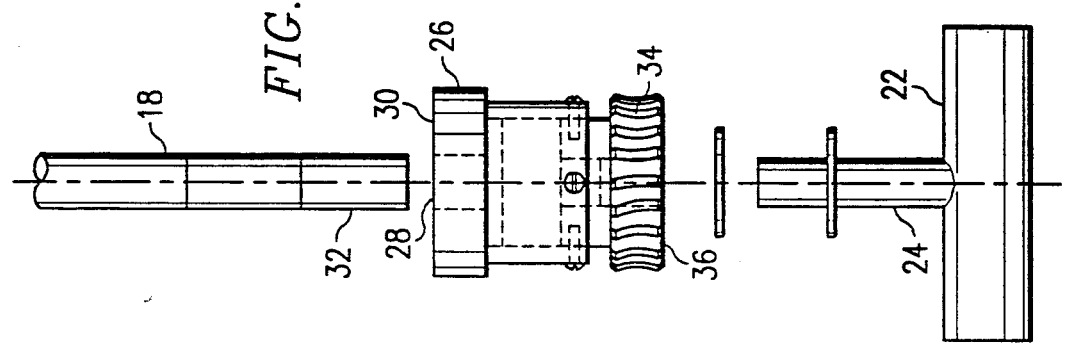

ROTISSERIE

TECHNICAL FIELD OF THE INVENTION

This invention relates to a rotisserie constructed to permit removal of a spit without the need for interrupting the operation of the rotisserie and, more particularly, to a rotisserie providing for the pivotal mounting of a plurality of spits.

BACKGROUND OF THE INVENTION

Rotisseries are well known in the restaurant industry and are commonly used for slow-roasting poultry, beef, and pork. A common rotisserie includes one or more spits mounted horizontally across the width of a heat source. The spits are rotated by a motor which is connected to the spits through a series of gears and/or chains. In order to place a spit over the heat source to initiate cooking, or in order to remove a spit from the rotisserie, it is necessary for the rotisserie operator to stop the rotation of rotisserie. Next, the operator must reach over the heat source in order to mount/remove the spit from the rotisserie. This process is both cumbersome and hazardous for the operator due to his/her proximity to the heat source. Furthermore, a prolonged stoppage of the rotisserie can cause uneven cooking or even burning of the meat on the remaining spits of the rotisserie.

It is desirable to have a rotisserie which permits the placement and removal of a spit without the need to work directly over the heat source. In addition, such a rotisserie preferably permits continued operation and rotation of remaining spits when one spit is being placed on or removed from the rotisserie.

SUMMARY OF THE INVENTION

The rotisserie of the present invention includes a central post mounted for pivotal movement between a first position and a second position. A spit retainer is rotatably mounted on the central post and is constructed to receive a first end of a spit. A drive mechanism is mounted on the spit retainer and is constructed to provide for rotation of the spit retainer and the spit when the central post is in the second position.

BRIEF DESCRIPTION OF THE DRAWINGS

A more complete understanding of the present invention and its advantages will be apparent from the following detailed description read in conjunction with the accompanying drawings in which:

FIG. 3 is an exploded view of the spit retainer and drive mechanism of the present invention; and FIG. 4 is a side view of the spit retainer and drive mechanism of the present invention.

DETAILED DESCRIPTION

Figure 1:
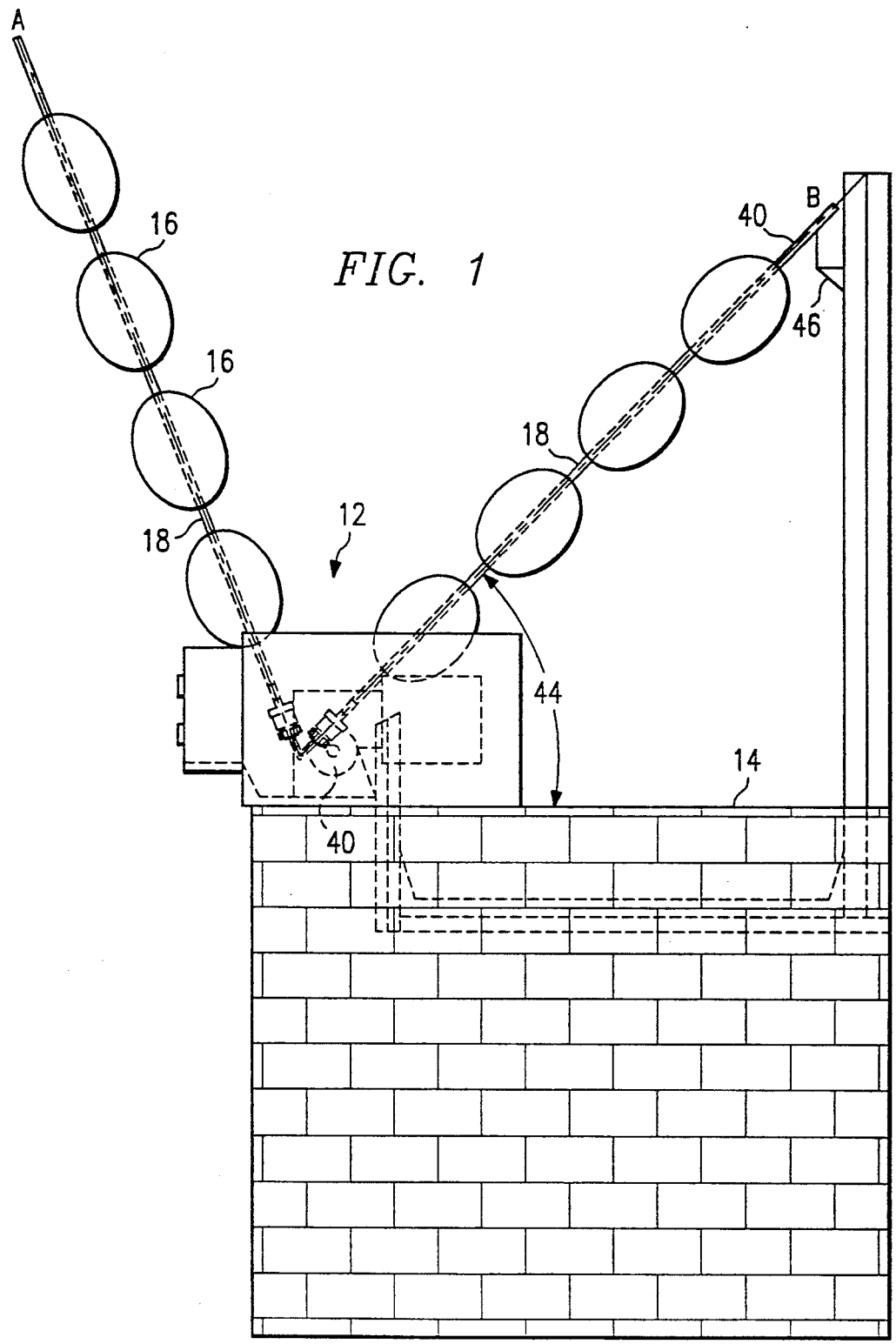
FIG. 1 is a side elevational view of the rotisserie of the present invention mounted over a heat source.

A rotisserie constructed in accordance with the present invention is generally indicated at 12 of FIG. 1. Rotisserie 12 is constructed to be mounted adjacent a heat source 14 in order to effect the roasting of meat 16 mounted on spit 18. As depicted in FIG. 1, spit 18 is mounted on rotisserie 12 such that it can be pivoted between position A, i.e., the "clear" position, and position B, i.e., the "cooking" position.

Figure 2:
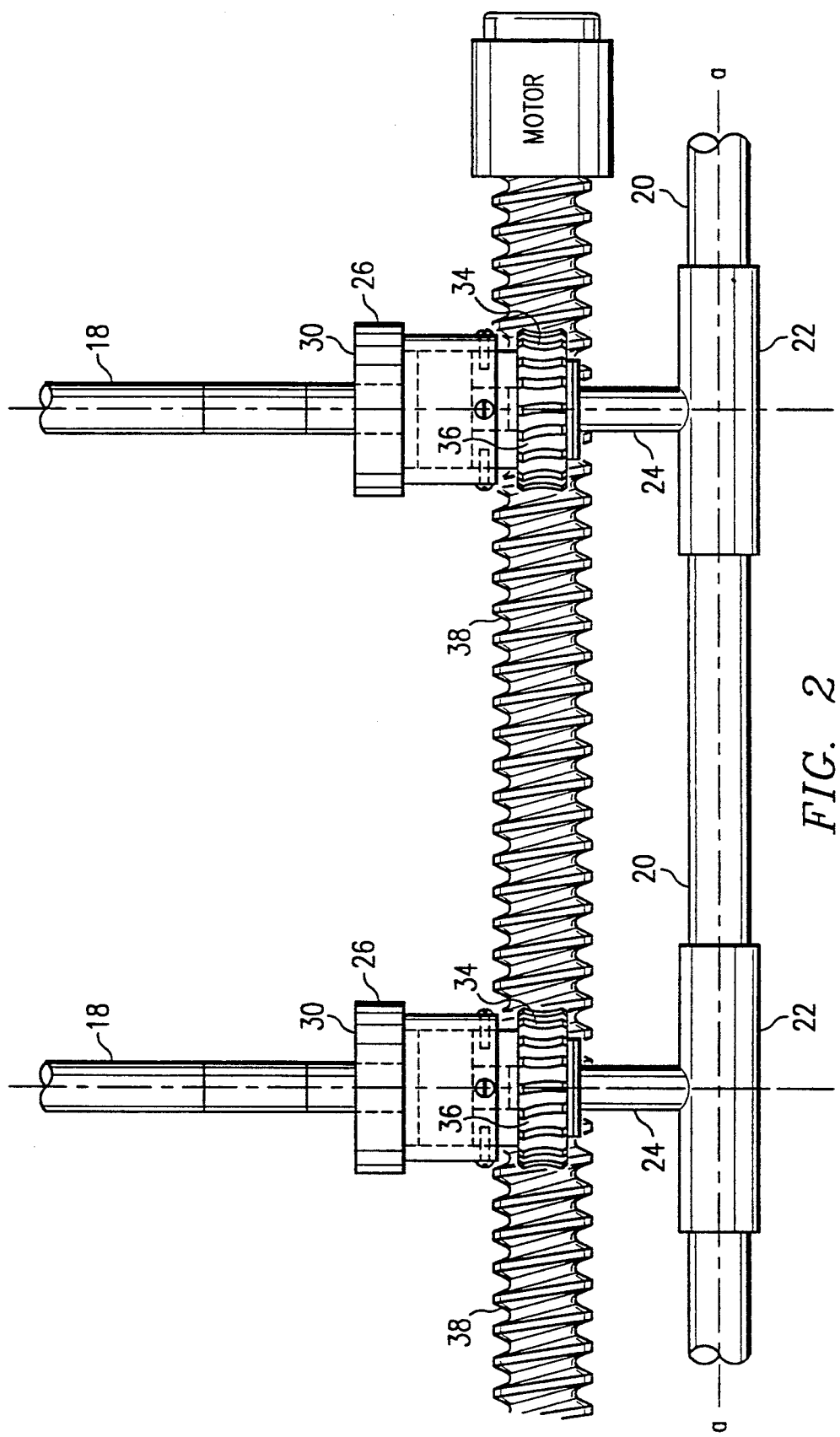
FIG. 2 is a frontal view of the spit retainer and drive mechanism of the present invention.

In an embodiment of the present invention depicted in FIGS. 2 and 3, rotisserie 12 includes a pivot rod 20 having a longitudinal axis a—a. Sleeve member 22 is pivotally mounted on pivot rod 20 such that the axis of rotation for sleeve member 22 is axis a—a. Central post 24 is mounted on sleeve member 22. Thus, central post 24 is pivotally mounted about pivot rod 20 with axis a—a serving as the axis of rotation of central post 24.

In the embodiment of the present invention depicted in FIGS. 2 and 3, spit retainer 26 is rotatably mounted on central post 24. Spit receptacle 28 is defined at distal end 30 of spit retainer 26. Spit receptacle 28 can have any cross-sectional form so long as it is able to receive first end 32 of spit 18. In a preferred embodiment, spit 18 and spit receptacle 28 are each square in cross-section with the internal dimensions of spit receptacle 28 being slightly larger than the external dimensions of spit 18. In this way rotational movement imparted to spit retainer 26 will be concurrently imparted to spit 18. It will be appreciated that spit 18 and spit receptacle 28 can have any polygonal shape so long as spit receptacle 28 is able to impart rotational motion to spit 18. In the event that spit 18 is round, a locking mechanism 29 can be provided within spit receptacle 28 in order to secure spit 18 therein. Locking mechanism 29 can have many forms including the clamping apparatus depicted in FIG. 4. Such a locking mechanism 29 can also be used if spit 18 has a polygonal cross section in order to provide greater retention of spit 18.

Drive mechanism 34 is provided in order to effect the rotation of spit retainer 26. In the embodiment of the present invention depicted in FIGS. 2-4, worm gear 36 is rotatably mounted on central post 24. Worm gear 36 is mechanically connected to spit retainer 26 such that rotational motion of worm gear 36 is imparted to spit retainer 26.

Worm 38 is preferably mounted in substantially parallel relation to axis a—a of pivot rod 20. Worm 38 is mechanically connected to motor 40 such that motor 40 is able to impart rotation to worm 38. Motor 40 can be of any known type having the capacity to impart rotation to a worm. It is to be appreciated that the mechanical capacity of motor 40 will be determined based upon the number of spits 18 in use as well a the weight of meat 16 to be placed on spits 18. In a preferred embodiment of the present invention, the speed of motor 40 is adjustable such that the speed of rotation imparted to worm 38 by motor 40 can be controlled by the person operating rotisserie 12. Worm gear 36 and worm 38 can have any dimensions so long as worm gear 36 mates with worm 38, i.e., such that rotation of worm 38 causes the rotation of worm gear 36. As above-discussed, the rotational motion of worm gear 36 is imparted to spit retainer 26 which in turn causes the rotation of spit 18. Accordingly, meat 16 on spit 18 is rotated about the longitudinal axis of spit 18 when worm 38 is rotated by motor 40.

As best seen in FIG. 4, worm gear 36 is disengaged from worm 38 when spit 18 is in position A, the "clear" position. Thus, when spit 18 is moved from position B to position A, the rotation of worm gear 36, spit retainer 26, and spit 18 is ceased, thereby facilitating the removal of spit 18 from spit receptacle 26. It will be appreciated that the pivoting of one spit 18 to position A will not affect operation of other spits 18 mounted on rotisserie 12. Stop 42 is provided in order to limit the motion of spit 18 in the direction of position A. Stop 42 can be disposed at any desired position in order to facilitate access to spit 18. The position of stop 42 depicted in FIG. 4 is provided only for the purpose of demonstrating its function.

The orientation of spit 18 and meat 16 when in position B can be adjusted by altering the relative positions of pivot rod 20, worm gear 36, and worm 38. It will be appreciated that angle 44 of spit 18 will decrease as the relative elevation of pivot rod 20 is increased. Thus, rotisserie 12 can be arranged to provide a variety of cooking angles 44 when spit 18 is in position B, the "cooking" position. In this way, the rotisserie of the present invention can be adjusted in order to provide for optimal cooking of meat 16 as well as providing for optimal aesthetic appeal of rotisserie 12.

It will be appreciated that the weight of spit 18 and meat 16 will urge worm gear 36 into engagement with worm 38 when spit 18 is in position B. In the event that large quantities of meat 16 are to be cooked on spit 18, the force imparted by worm gear 36 on worm 38 will be great, thus causing wear of worm gear 36 and worm 38. Accordingly, in one of the present invention, rest 46 is provided. Rest 46 is constructed to receive second end 50 of spit 18 and to permit the rotation of spit 18. Rest 46 is positioned such that spit 18 rests therein when worm gear 36 is in engagement with worm 38. Rest 46 thus provides additional stability while simultaneously reducing the wear of worm gear 36 and worm 38.

Rotisserie 12 of the present invention can be constructed to permit the simultaneous use of numerous spits, as depicted in FIG. 2. A plurality of sleeve members 22 can be mounted on pivot rod 20. Further, sleeve members 22 can be slidably mounted on pivot rod 20 such that any given spit 18 can be positioned at any point along the width of heat source 14. Rotisserie 12 thus provides a wide variety of cooking options.

Although the rotisserie of the present invention has been described in detail herein with respect to specific preferred embodiments, it will be evident that various and further modifications are possible without departing from the true spirit and scope of the present invention.

What is claimed is:

1. A rotisserie for imparting axial rotation to a spit having a first end and a second end comprising:
   a central post having a first end and a second end, said central post being constructed for pivotal movement about a first axis between a first position and a second position;
   a spit retainer rotatably mounted on said central post at said second end of said central post, said spit retainer being constructed releasably to retain said first end of said spit; and
   a drive mechanism mounted on said spit retainer, said drive mechanism being constructed to impart rotational motion to said spit retainer relative to said central post.

2. The rotisserie of claim 1 further comprising a pivot rod mounted coaxially with said first axis and a sleeve pivotably mounted on said pivot rod, said first end of said central post being mounted on said sleeve whereby pivotal movement of said sleeve about said pivot rod is imparted to said central post.

3. The rotisserie of claim 1 wherein said drive mechanism comprises a worm gear, said rotisserie further comprising a worm and a motor mechanically connected to said worm, said motor being constructed to impart rotation to said worm, said worm gear being constructed to mate with said worm when said central post is in said second position, and said worm gear being constructed to be disengaged from said worm when said central post is in said first position.

4. The rotisserie of claim 3 wherein said motor includes an adjustable speed control whereby the speed of rotation of said worm can be adjusted.

5. The rotisserie of claim 1 further comprising a spit rest constructed to receive said second end of said spit when said central post is in said second position, said spit rest also being constructed to permit rotational movement of said spit relative thereto.

6. The rotisserie of claim 1 further comprising a stop mounted to engage said central post when said central post is in said first position.

7. A rotisserie comprising:
   a spit having a first end and a second end;
   a pivot rod;
   a central post pivotably mounted on said pivot rod, said central post having a first end and a second end, said central post being constructed for pivotal movement about a first axis between a first position and a second position;
   a spit retainer rotatably mounted on said central post at said second end of said central post, said spit retainer being constructed releasably to retain said first end of said spit; and
   a drive mechanism mounted on said spit retainer, said drive mechanism being constructed to impart rotational motion to said spit retainer relative to said central post.

8. The rotisserie of claim 7 further comprising a stop mounted to engage said central post when said central post is in said first position.

9. The rotisserie of claim 7 wherein said drive mechanism comprises a worm gear, said rotisserie further comprising a worm and a motor mechanically connected to said worm, said motor being constructed to impart rotation to said worm, said worm gear being constructed to engage said worm when said central post is in said second position, and said worm gear being constructed to be disengaged from said worm when said central post is in said first position.

10. The rotisserie of claim 7 further comprising a spit rest constructed to receive said second end of said spit when said central post is in said second position, said spit rest also being constructed to permit rotational movement of said spit relative thereto.

11. A rotisserie for use with a heat source having a length and a width, said rotisserie comprising:
   a pivot rod constructed to mounted proximal said heat source;
   a worm mounted in substantially parallel relation to said pivot rod, said worm being mechanically connected to a motor constructed to impart rotational movement to said worm; and
   a plurality of spit devices mounted on said rotisserie, each spit device comprising:
     a spit having a first end and a second end;
     a sleeve pivotably mounted on said pivot rod, said sleeve being mounted for pivotal movement about said pivot rod between a first position and a second position;
     a central post having a first end and a second end, said first end of said central post being mounted on said sleeve;

a spit retainer rotatably mounted on said second end of said central post, said spit retainer being constructed releasably to retain said first end of said spit; and a worm gear mounted on said spit retainer, said worm gear constructed to engage said worm when said sleeve is in said second position and said worm gear being constructed to be disengaged from said worm when said sleeve is in said first position.

12. The rotisserie of claim 11 further comprising a plurality of spit rests, each said spit rest being constructed to receive said second end of one of said spits when said sleeve is in said second position, said spit receiver also being constructed to permit rotational movement of said second end of said spit relative thereto.

13. The rotisserie of claim 11 further comprising a stop device, said stop device being constructed to engage said central post when said sleeve is in said first position.

14. The rotisserie of claim 11 wherein said motor includes an adjustable speed control whereby the speed of rotation of said worm can be adjusted.

* * * * *